United States Patent
Hülser et al.

(10) Patent No.: US 7,474,953 B2
(45) Date of Patent: Jan. 6, 2009

(54) PROCESS FOR DETERMINING PARTICLE EMISSION IN THE EXHAUST FUME STREAM FROM AN INTERNAL COMBUSTION ENGINE

(75) Inventors: Holger Hülser, Graz (AT); Manfred Krickler, Nestelbach (AT)

(73) Assignee: AVL List GmbH, Graz (AU)

( * ) Notice: Subject to any disclaimer, the term of this patent is extended or adjusted under 35 U.S.C. 154(b) by 125 days.

(21) Appl. No.: 11/667,761

(22) PCT Filed: Oct. 20, 2005

(86) PCT No.: PCT/AT2005/000416

§ 371 (c)(1),
(2), (4) Date: May 15, 2007

(87) PCT Pub. No.: WO2006/055992

PCT Pub. Date: Jun. 1, 2006

(65) Prior Publication Data

US 2008/0097678 A1  Apr. 24, 2008

(30) Foreign Application Priority Data

Nov. 25, 2004 (AT) ............... A 1986/2004
Dec. 9, 2004 (AT) ............... A 2072/2004
May 10, 2005 (AT) ............... A 795/2005

(51) Int. Cl.
*G06F 19/00* (2006.01)
(52) U.S. Cl. ............... 701/108; 701/101; 60/286
(58) Field of Classification Search ......... 701/108–109, 701/101–102, 113; 60/274, 276, 285, 286, 60/289, 303
See application file for complete search history.

(56) References Cited

U.S. PATENT DOCUMENTS

| 5,682,317 A | 10/1997 | Keeler et al. |
| 6,826,906 B2 * | 12/2004 | Kakwani et al. .......... 60/286 |
| 7,143,578 B2 * | 12/2006 | Kakwani et al. .......... 60/286 |
| 2003/0216855 A1 | 11/2003 | Liang et al. |

FOREIGN PATENT DOCUMENTS

| DE | 10014224 | 11/2000 |
| DE | 19945372 | 3/2001 |
| DE | 10124235 | 12/2002 |
| DE | 10252732 | 5/2004 |
| EP | 1108866 | 6/2001 |
| EP | 1541829 | 6/2005 |
| JP | 2002-180817 A * | 6/2002 |
| JP | 2005-83305 A * | 3/2005 |
| WO | 03006976 | 1/2003 |
| WO | 2005001266 | 1/2005 |

OTHER PUBLICATIONS

H. Hulser et al., "Elektronik Ermoglicht Innovationen in der Motorentwicklung" in MTZ Jan. 2003, vol. 64, pp. 30-37.
English Abstract DE 102 52 732.

* cited by examiner

*Primary Examiner*—Hieu T Vo
(74) *Attorney, Agent, or Firm*—Dykema Gossett PLLC

(57) ABSTRACT

A process for determining particle input into a particle filter arranged in the exhaust fume stream of an internal combustion engine makes it possible to determine the mass of deposited particles by taking into account particle and nitrogen oxide emission.

37 Claims, 5 Drawing Sheets

Figure 1:
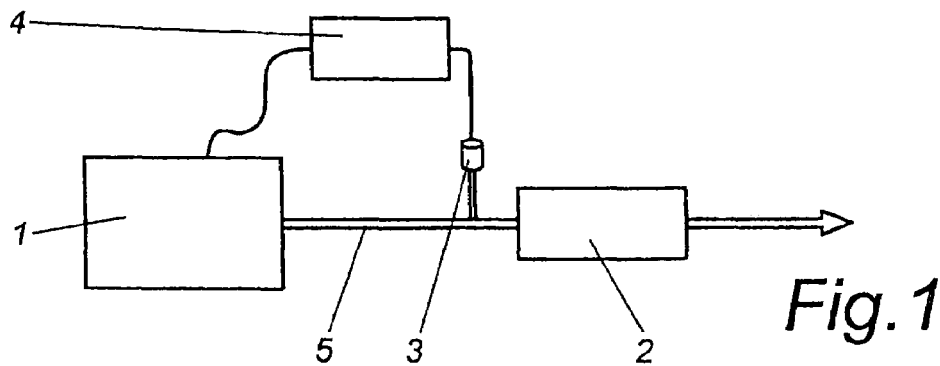

PROCESS FOR DETERMINING PARTICLE EMISSION IN THE EXHAUST FUME STREAM FROM AN INTERNAL COMBUSTION ENGINE

The invention relates to a method for determining particulate emission in the exhaust gas stream of an internal combustion engine. In addition, the invention relates to methods of determining the mass of deposited particles in a particulate filter situated in the exhaust gas stream of an internal combustion engine. The invention further relates to a method for controlling the regeneration of an exhaust treatment device, especially a particulate filter, by means of a computational model which is preferably based on a characteristic map, where the treatment device is partitioned into at least two, and preferably five, cells, and the deposit load of each cell is found by means of a deposition model, and a regeneration process for the treatment device is initiated depending on the deposit load.

In order to carry out effective particulate filter regeneration the deposit load state of the particulate filter or the state of particulate emissions must be known as accurately as possible. A method which describes how regeneration is initiated —based on the deposit load state of the particulate filter and further parameters, such as time or distance traveled—is for instance presented in DE 199 45 372 A1.

It is known to determine the deposit load state of the particulate filter by measuring the pressure difference. Since such measurements are highly inaccurate, however, it is further known to consider an estimate of the mass of particles accumulated in the particulate filter in addition to the pressure difference.

To this end it is known to estimate particulate emissions from operational characteristic maps comprising operational data of the engine such as engine speed, torque, etc. It is also known to determine transient emissions on the basis of stationary characteristic maps and of further measured data such as the $\lambda$-value or the exhaust gas recirculation rate. Characteristic maps of this kind are based on an ideal engine. Deviations of the emissions of a real engine due to aging and/or parts tolerances from the ideal emissions as stored in the characteristic map cannot be taken into account.

Measuring systems which continuously monitor particulate emissions are known, but are costly and prone to wear and failure. DE 101 24 235 A1 describes for instance a method and a device for comprehensively characterising and monitoring exhaust gas and for engine control, where solid and fluid particles are detected and characterised either simultaneously or with temporal delay. The method is based on either single or combined use of laser-induced Raman scattering, laser-induced break-down spectroscopy, laser-induced ionisation-scopy, laser-induced atomic fluorescence spectroscopy, IR-/VIS-/UV-laser absorption spectroscopy and laser-induced incandescence technology. The sensor and control system needed for accurate determination of particulate emissions is very complex, making application of the system for mass production relatively costly.

The known deposit load models for particulate filters describe reality only insufficiently, since the oxidizing influence of nitrogen oxides on soot particles is not taken into account. An estimate of the mass of particles accumulated in the particulate filter, which is solely based on the particles present in the exhaust duct while disregarding nitrogen oxides and their activity, will lead to grave deviations. Above all, the particle mass accumulated in the particulate filter will be overestimated, leading to a higher number of regeneration cycles of the filter and thus to higher fuel consumption.

A particulate filter positioned in the exhaust gas stream of an internal combustion engine, in particular a filter of the "wall-flow" type, must be regenerated if it is highly loaded with inflammable particles. To carry out an effective particulate filter regeneration, accurate knowledge of the deposit load state is required. DE 199 45 372 A1 for instance describes a method for initiating regeneration based on the deposit load state of the particulate filter and further data, such as time and distance traveled.

It is known to determine the deposit load state of the particulate filter by measuring the pressure difference. But since such measurements are quite inaccurate it is common knowledge that an estimate of the mass of particulates accumulated in the filter be considered in addition to the pressure difference. To this end it is known to estimate particulate emissions from operational characteristic maps which contain operational data of the engine such as engine speed, torque etc.

Some known methods take into account only the mass of particulates accumulated in the filter, ignoring the distribution of this mass inside the filter. Such a method which takes into account only the particle mass but not its distribution, may be termed a "zero-dimensional" model of the particulate filter.

From DE 102 52 732 A1 an improved method is known in which a one-dimensional model of the spatial distribution of the particles in the filter is used to improve the accuracy of determining the deposit load. The method disclosed in the publication uses particle distribution only for computing a correction factor from an improved determination of the flow resistance of the deposit-loaded particulate filter, however, which factor helps to determine particle mass more accurately. The correction factor is used to correct a certain characteristic quantity of the particulate filter obtained by means of pressure- and temperature-sensors, and thus finally increases the accuracy of the determined deposit load. The deposit load leading to initiation of regeneration is thus conventionally determined by pressure sensors.

The paper "Elektronik ermöglicht Innovationen in der Motorenentwicklung", Dr. Holger Hülser et al., MTZ January 2003, vol. 64, page 30 to 37, presents a computational model which subdivides the exhaust treatment device in a number of cells and determines the deposit load state of each cell by means of a deposition model. Once the deposit load state is determined active regeneration of the particulate filter need only be initiated if certain critical limits are exceeded. In contrast to a particulate filter system exclusively based on pressure measurement a smaller number of regeneration cycles are required in this case.

It is the object of the present invention to avoid these disadvantages and to provide in a simple manner an accurate estimate of particulate emissions in the exhaust gas stream of an internal combustion engine. A further object of the invention is an improved estimate of particles deposited in the particulate filter, based on an estimate of the nitrogen oxides present in the exhaust gas. It is yet another object of the invention to further improve the management of particulate filter regeneration based on a computational model.

The invention attains these aims by the following steps:
preparing an emissions model based on an operational characteristic map of the engine;
measuring the actual particulate emissions in the exhaust gas stream during a fixed or variable measuring interval and integrating the particulate emissions over the measuring interval;
computing the ideal particulate emissions by means of the emissions model during the measuring interval and integrating the ideal emissions over the measuring interval;

comparing the measured actual particulate emissions and the computed ideal particulate emissions;

determining a correction factor based on the difference of measured actual particulate emissions and computed ideal particulate emissions;

taking into account the correction factor when determining the ideal particulate emissions from the emissions model.

The method according to the invention proposes to integrate the emissions found from the characteristic-map-based emissions model during the measurement period of the integrating particle sensor and to compare the result with the measured value. If differences occur the emissions determined by the characteristic-map-based model are multiplied by a factor in such a way that the differences are reduced.

In a simple variant of the invention it is provided that one and the same correction factor is chosen for all operating points of the internal combustion engine. In the simplest case the correction factor can be chosen as the reciprocal value of the ratio of ideal to measured emissions. It is of particular advantage if the correction factor undergoes only small changes between individual measurements to smooth out fluctuations.

To this end it may be provided that the present correction factor f_K is computed from a previous value of the correction factor f_K_old and the ratio soot_ratio of actually measured to ideal particulate emissions by means of the formula $$f\_K = f1 * f\_K\_old + (1-f1)/\text{soot\_ratio}$$

where the coefficient f1 has a value between 0 and 1, preferably between 0.85 and 0.95. In order to avoid large errors due to faulty measurements it will be of advantage to apply the correction only if it lies within a certain plausible range.

More accurate results may be obtained if different correction factors are chosen for different operating regions, the different correction factors advantageously being determined on the basis of a correction characteristic maps. It is of particular advantage if the determination of the correction factors takes into account the frequency distribution of the operating states of the internal combustion engine. A histogram in which is recorded the frequency of certain torque and engine speed intervals as the engine traces a path through different operating states, forms the basis for determining the correction factors.

It is desirable to carry out measurements by means of at least one particle sensor, which measures and integrates the particulate emissions over a prolonged period of time, for instance some minutes. Integrating sensors of this kind are for instance known from WO 03/006976 A2.

Improved estimates of the particulate emissions of an internal combustion engine will permit improved determination of the deposit load on a particulate filter. Improved knowledge of the deposit load of the particulate filter will in turn permit a better targeted initiation of regeneration, since the safety margin against an overloaded filter, which would suffer thermal damage in regeneration, may be reduced. Additional fuel consumption due to regeneration of the diesel particulate filter may thus be substantially reduced.

The method of the invention will thus improve estimation of particulate emissions. Detailed information about particulate emissions is important in order to be able to regenerate exhaust treatment systems, especially wall-flow particulate filters, as needed. Together with a suitable deposit load model for the particulate filter this will permit regeneration frequency to be substantially lowered. The method of the invention may be implemented as software in an engine control unit.

Improved estimation of particles deposited in the particulate filter may especially be achieved by the following steps:

preparing a preferably characteristic-map-based emissions model for particulate matter;

preparing at least one preferably characteristic-map-based emissions model for nitrogen oxides;

preparing a preferably temperature-dependent model for the oxidation of soot particles by nitrogen oxides;

determining the theoretical particulate mass and/or particulate concentration for at least one operating point with the use of the emissions model for particles;

determining the nitrogen oxides for at least one operating point using the emissions model for nitrogen oxides;

determining a negative equivalent particulate mass and/or concentration for the nitrogen oxides determined as above with the use of the oxidation model of soot particles by nitrogen oxides;

determining the effective particulate mass and/or concentration using the emissions model for particles and the negative equivalent particulate mass, and accumulating the effective particulate mass and/or concentration in a model of the particulate filter.

The invention considers the fact that the soot particles present in the exhaust gas are oxidized by the simultaneously present nitrogen oxides either in the exhaust duct and/or in the particulate filter and thus do not settle in the particulate filter. Oxidation of the particles by nitrogen oxides is known as CRT-effect (Continuous Regeneration Trap) and is strongly dependent on the temperature of the particulate filter. To take this into account it is advantageously provided that the temperature of the particulate filter is measured at least one site and that the negative equivalent particle mass and/or the negative equivalent particle concentration is determined in dependence of the temperature of the particulate filter, this temperature being preferably determined by measuring the exhaust gas temperature preferably upstream of the particulate filter. It is also possible to consider different temperatures at different points of the particulate filter.

An even better estimate of particle deposition can be obtained by using separate characteristic-map-based emissions models for NO and $NO_2$ emissions, and by determining NO and $NO_2$ emissions for at least one operating point, and by determining effective particulate masses and/or concentrations based on the NO and $NO_2$ emissions. In this way it is taken into account that the oxidizing effect of different nitrogen oxides, such as NO or NO2, on soot particulate will differ.

A further improvement of the estimate can be achieved if in determining the effective particulate mass it is taken into account that the nitrogen oxides present in the exhaust stream will better oxidize the soot particles present in the exhaust stream than those already deposited in the particulate filter.

Since the negative equivalent particulate masses are added to the soot particles from the emissions model, negative values may be obtained for the effective particulate. To take care of the fact that particles already deposited in the filter are removed only very slowly, even if there is a large surplus of nitrogen oxides over particulates, provisions may be made that the value of the effective particulate mass cannot fall below a certain limit.

Instead of mass flows of the components in the exhaust gas one could also use the corresponding concentrations or the volume flow of exhaust gas.

Improved estimates of the particulate emissions of the internal combustion engine will permit an improved determination of the deposit load on a particulate filter. Improved knowledge about the deposit load of the particulate filter will in turn permit a better targeted initiation of regeneration, since the safety margin against an overloaded filter, which would suffer thermal damage in regeneration, may be reduced. Additional fuel consumption due to regeneration of the diesel particulate filter may thus be substantially reduced.

The method of the invention improves the estimation of the soot particle mass deposited in a particulate filter. Detailed information on the deposited particle mass is important in order to be able to regenerate exhaust treatment systems, especially wall-flow particulate filters, as needed. In combination with a suitable algorithm for initiating particulate filter regeneration, regeneration frequency may thus be substantially lowered. The method of the invention may be implemented as software in the engine control unit.

To achieve a further improvement in the management of particulate filter regeneration it is proposed that for each cell at least one threshold value for the maximum allowable deposit load is defined and that the regeneration process for the exhaust treatment system is initiated if the deposit load of at least one cell exceeds the relevant threshold value. Alternatively or additionally it may be provided that based on the deposit load of at least one cell a numerical deposit state index is determined and that the regeneration process is initiated depending on the deposit state index.

In contrast to known methods for operating a particulate filter, the spatially inhomogeneous distribution of particles in the filter will not only be used for estimating the total mass of deposited particles, but will directly influence the initiation of particulate filter regeneration. This improve-ment in regeneration initiation will permit the number of regenerations to be reduced, thus also reducing additional fuel consumption. In particular, thermal damage to the particulate filter due to local overheating of regions with particularly heavy deposit load can be avoided.

According to the invention the deposit load state of at least two cells of the particulate filter is determined. The cells of the particulate filter do not necessarily coincide with physically realised cells, but may be fictitiously defined. To describe different cells in the flow direction of the exhaust gas or transversally to the flow direction, the computational model for the deposit load of the particulate filter must at least be one-dimensional, i.e. at least one dimension of length, for instance in flow direction and/or transversal thereto, must be represented. Besides the total particle mass, the masses in the different regions of the particulate filter are considered in order to initiate particulate filter regeneration depending on particle masses in the different cells of the particulate filter and on their distribution.

In the computational model the particulate filter is preferably partitioned into cells of equal size. This will minimize computation. In principle it will also be possible for the cells to have different sizes.

In an especially preferred variant the proposal is put forward that the deposition model divides the mass of particles entering each cell into a portion which is deposited in the cell and into a portion which leaves the cell. The portion deposited in each cell is primarily relevant for the deposit load state.

According to the invention it may be provided that corresponding threshold values of at least two cells differ, the threshold value of the upstream cell preferably being smaller than that of the downstream cell. If the deposit load of at least one cell exceeds the corresponding threshold value the regeneration process is initiated. It is also possible to derive the decision of whether to regenerate or not from the deposit load state of a plurality of cells. Information concerning the deposit load state may be obtained from the distribution of particles in the cells of the particulate filter model. This information is fed into a computational routine, which derives a statement regarding the necessity to regenerate from the deposit load state and possible further data. This statement may take the form of a binary request (yes/no) or a numerical deposit state index expressing an assessment of the urgency of regeneration of the particulate filter. The regeneration request may furthermore be combined with other information, such as engine- or exhaust gas parameters, prior to actually triggering regeneration of the particulate filter.

To obtain a precise statement concerning the deposit load state of the particulate filter it is of advantage if at least for a group of cells at least two threshold values are defined, preferably a first and a second threshold value, and if the deposit state index is computed depending on the frequency with which these values are exceeded, the exceeding of higher threshold values preferably influencing the deposit state index to a greater extent than the exceeding of lower threshold values.

It is of particular advantage if the particles are classified as combustible or non-combustible particulate and if the load of each cell is separately determined for combustible and non-combustible particulate, regeneration of the particulate filter being initiated only if the load of one or more cells with combustible particles exceeds a threshold value for combustible particles. This will further increase the effectiveness of regeneration.

In a further variant of the invention it is provided that the deposit load state is determined in each section as a function of the amount of nitrogen oxides present in the exhaust gas stream and/or as a function of the temperature of the particulate filter. This will take into account the fact that nitrogen oxides present in the exhaust gas stream can substantially reduce deposition of particles in the particulate filter, especially if the temperature of the filter is high and/or if the filter has a catalytic coating. It is furthermore possible to consider the influence of nitrogen oxides on the mass of particles already deposited in the particulate filter. Based on particulate mass derived from the particulate emissions model, on nitrogen oxide mass derived from the NOx emissions model, and on the temperature of the particulate filter, an effective particulate mass which is reduced by the temperature-dependent influence of the nitrogen oxides can be determined, which is deposited in the particulate filter.

The temperature of the particulate filter must be taken into account since oxidation of the particles due to nitrogen oxides depends on the temperature of the particulate filter. At temperatures below 200° C., approximately, no oxidation due to NOx will occur. In a simple variant, in the nitrogen oxide emissions model the mass of nitrogen oxides is multiplied by a factor depending on the temperature of the particulate filter, and the product is subtracted from the particle mass, the result of the subtraction being limited below by an only slightly negative value, giving the effective particulate mass. At low temperatures the factor has the value zero, at high temperatures it has a fixed value, which takes into account the different (mean) molecular mass of nitrogen oxides and soot.

Figure 2:
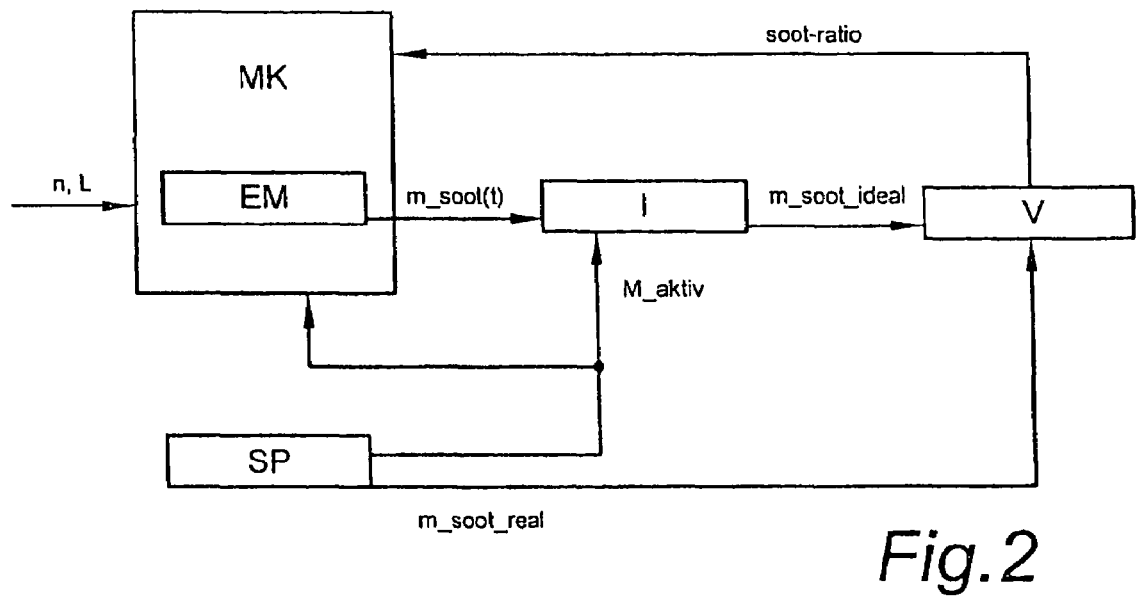
Figure 3:
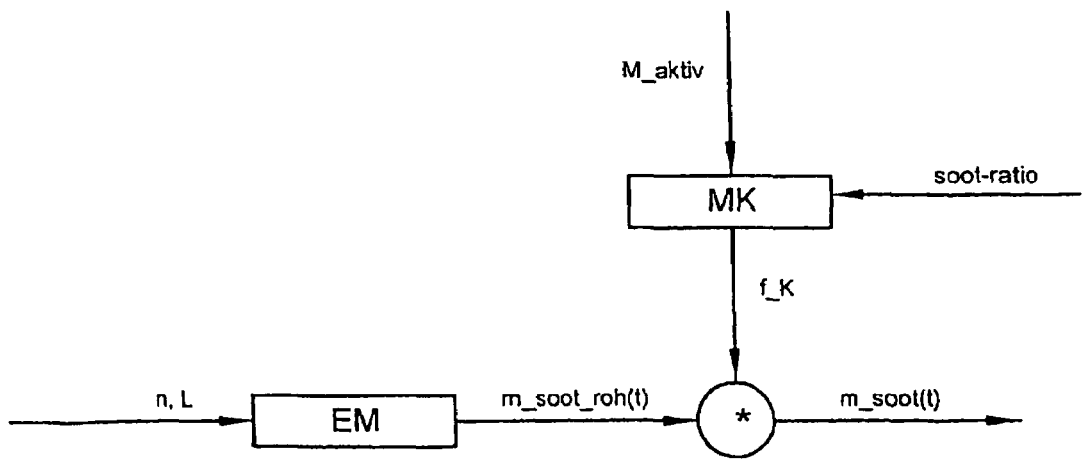
Figure 4:
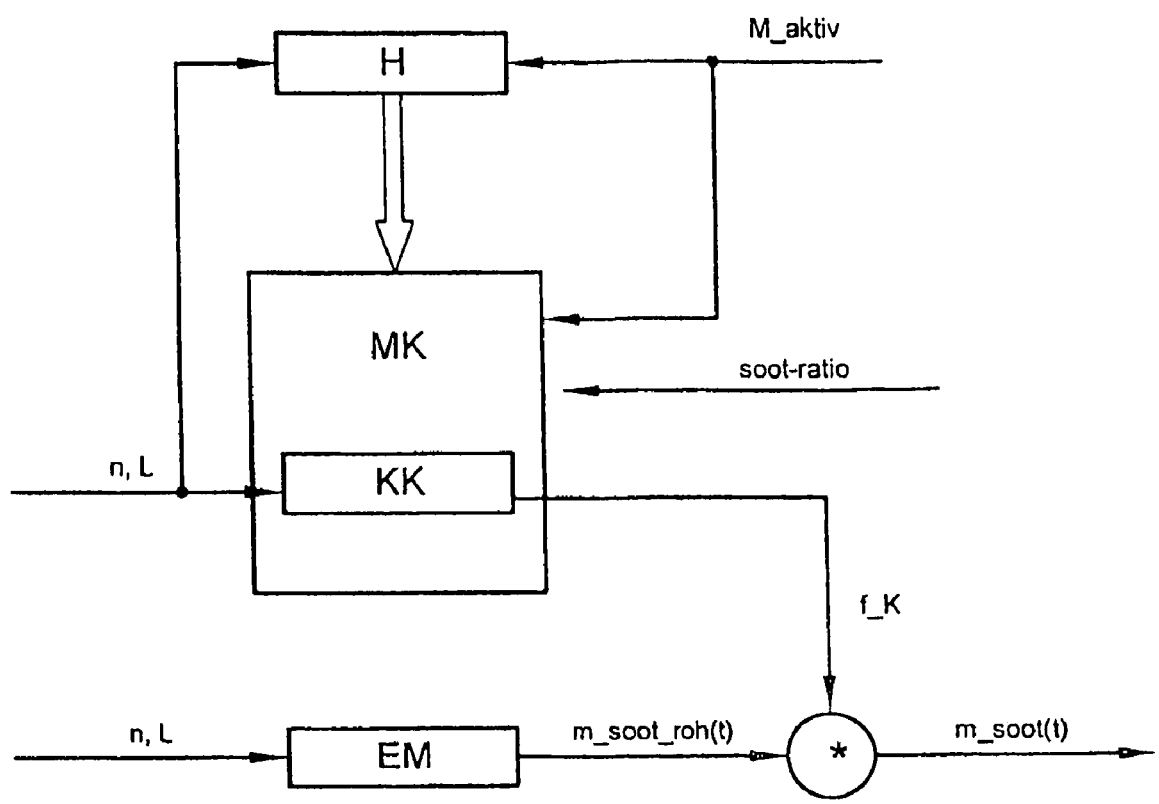
Figure 5:
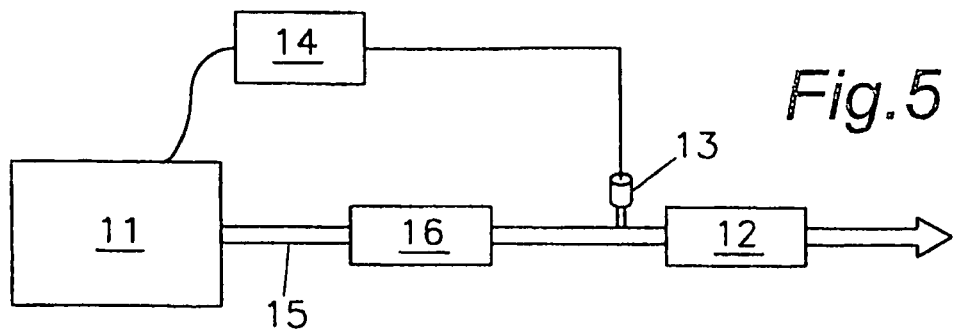
Figure 6:
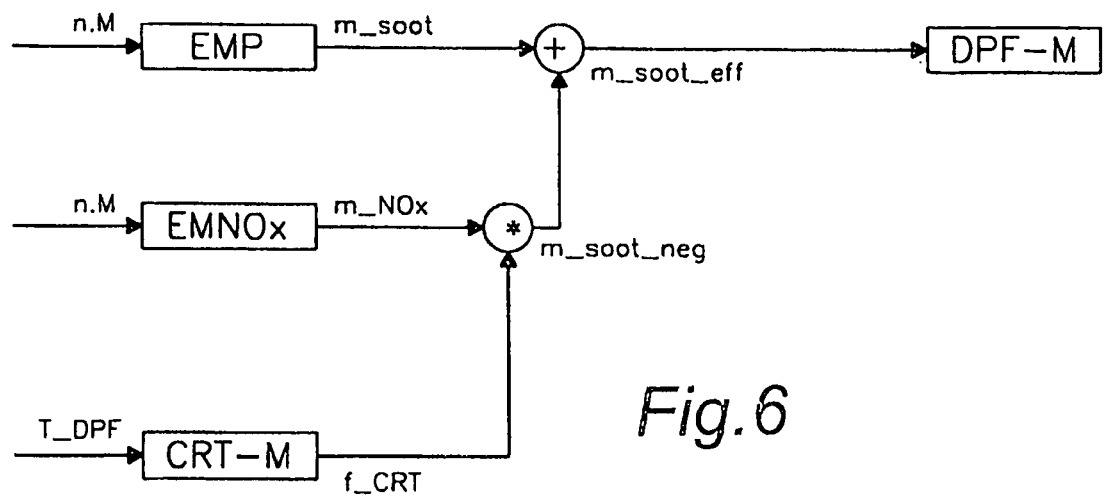
Figure 7:
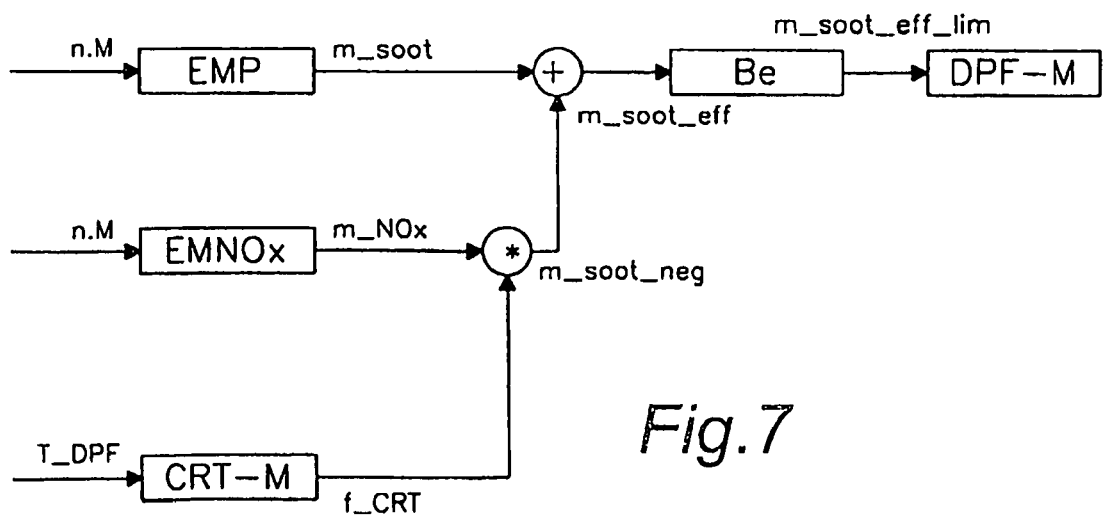
Figure 8:
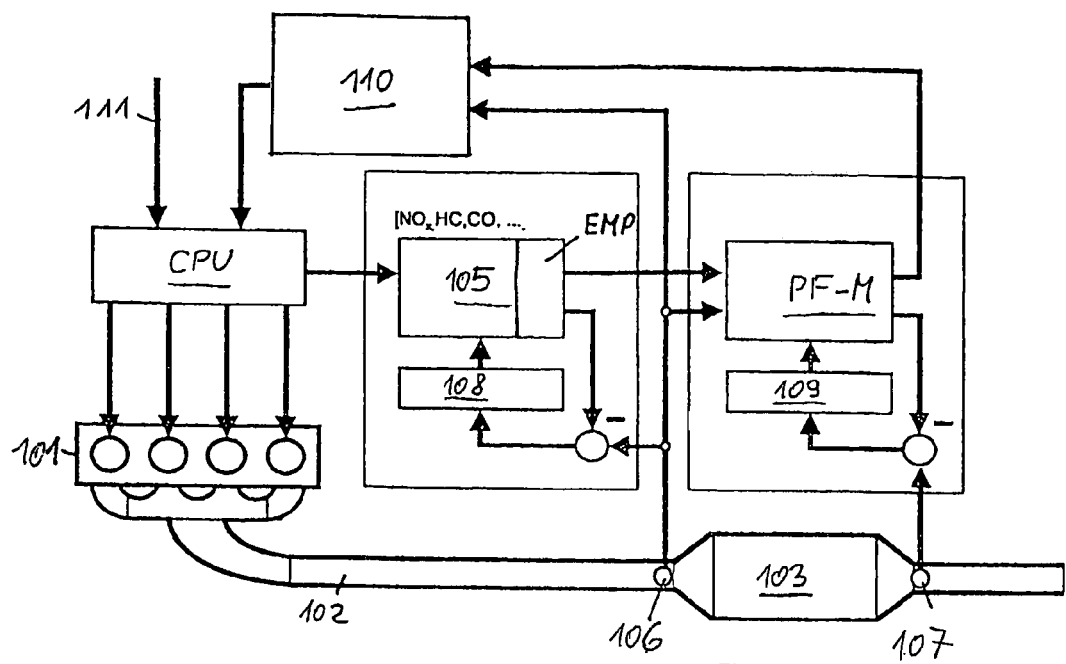
Figure 9:
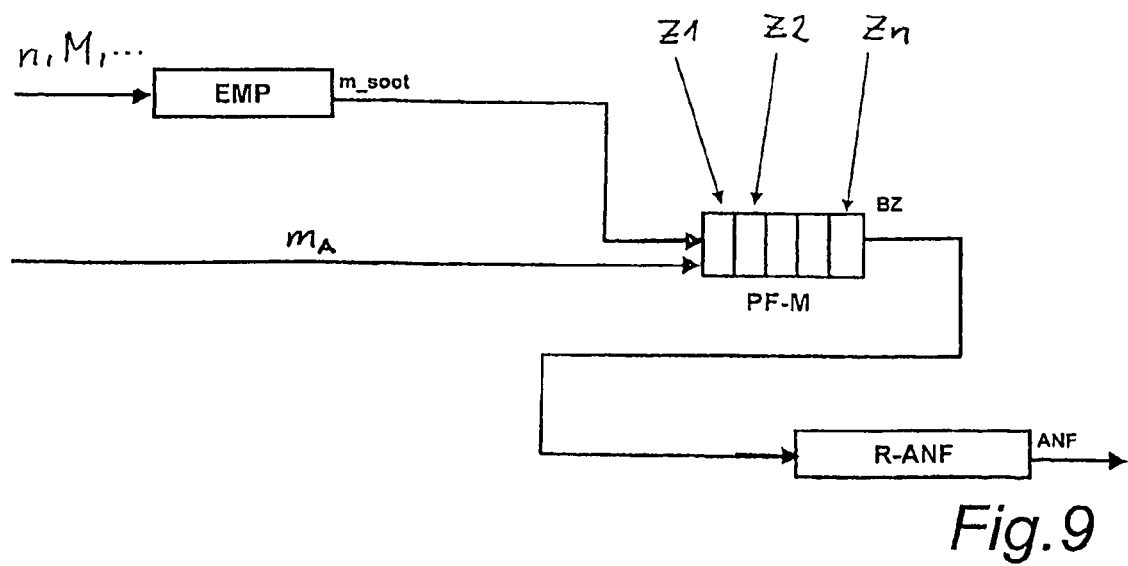
Figure 10:
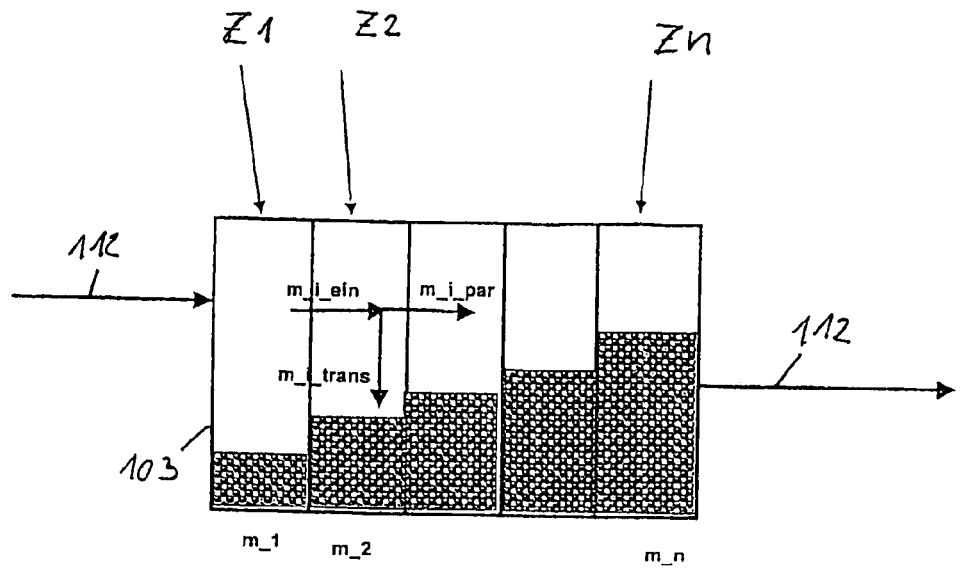
Figure 11:
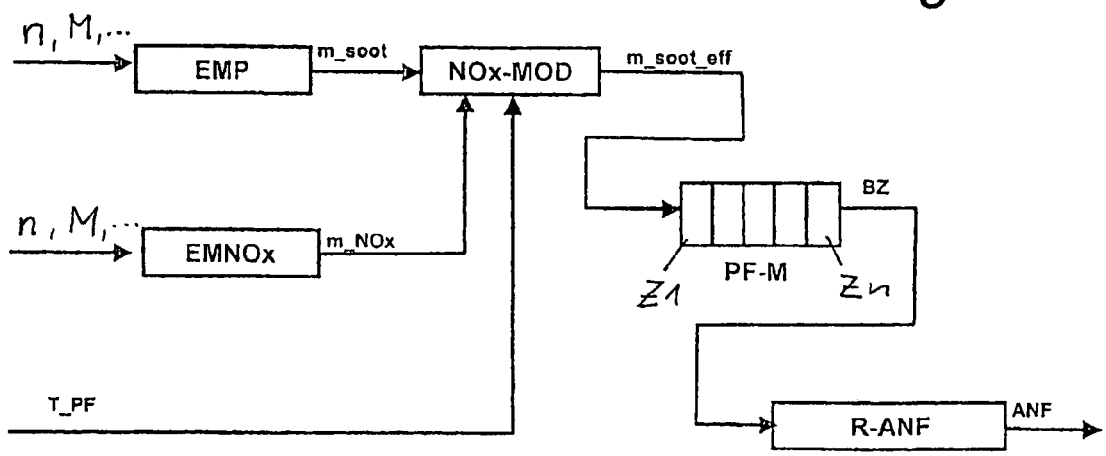
Figure 12:
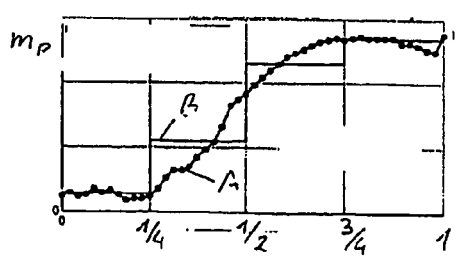
Figure 13:
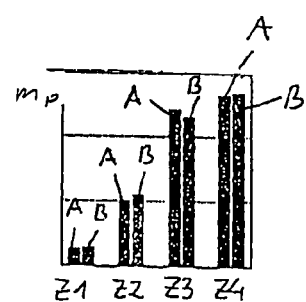

The invention will now be described in more detail with reference to the enclosed drawings. There is shown in FIG. 1 the configuration of the system implementing the method of the invention;

FIG. 2 a relevant detail of the control algorithms in the engine control unit;

FIG. 3 a simple correction procedure for the emissions model;

FIG. 4 an improved correction procedure for the emissions model;

FIG. 5 a second variant of the configuration of the system implementing the method of the invention;

FIG. 6 a simple method for determining the particle deposit load;

FIG. 7 an improved method for determining the particle deposit load;

FIG. 8 the configuration of the system implementing the method of the invention in principle;

FIG. 9 the particulate filter model;

FIG. 10 the process sequence in a variant of the invention;

FIG. 11 the process sequence in a second variant of the invention;

FIG. 12 the particle distribution in flow direction in a particulate filter; and FIG. 13 the accumulated particle mass per cell.

FIG. 1 shows the basic configuration of the system: in the exhaust duct of an internal combustion engine 1 a particulate filter 2 is located. A particle sensor 3 is also provided in the exhaust duct 5, preferably preceding the particulate filter 2. The internal combustion engine 1 is controlled by an electronic control unit ECU. The particle sensor 2 is also connected to the control unit ECU. Further sensors, e.g. a difference pressure sensor, are possible but not strictly required by the method of the invention.

FIG. 2 shows the relevant part of the control algorithms in the engine control unit 4. Based on operational data of the engine, such as engine speed n, engine torque M, etc., a conventional emissions model EM provides an ideal value for the particle mass m_soot(t) emitted by the engine. This value is fed into an integrator I. Besides the signal input port for the particle mass the integrator I also has a control input port.

Furthermore there is provided a control algorithm SP for the integrating particle sensor. Such integrating particle sensors accumulate particles on the sensor during a measurement interval. At the end of the measurement interval the total mass m_soot_real of particles on the sensor is determined. Usually the integrating particle sensor has to be regenerated and is not available for further measurement during the regeneration period. It is therefore provided that the control algorithm SP for the integrating particle sensor has, besides the output m_soot_real of the particle mass, at least one further signal output which indicates if particle measurement is currently active (signal M_aktiv). After regeneration the integrating particle sensor is available for further measurement.

The signal M_aktiv is applied to the control input port of the integrator I. The integrator is designed such that it integrates the mass input signal over the period of time during which the signal M_aktiv is present at the control input port. When the signal M_aktiv is no longer present the integrated value is stored in the variable m_soot_ideal and the integrator is reset to zero. The integrated value of emissions m_soot_ideal from the emissions model EM is now present at the output port of the integrator I.

This value as well as the real integrated particle mass m_soot_real measured by the integrating particle sensor during the measurement period, are now fed to a comparator algorithm V. The comparator V now determines the ratio soot_ratio of integrated emissions from the emissions model to real emissions measured by the particle sensor $$soot\_ratio = m\_soot\_ideal/m\_soot\_real.$$

Other mathematical operations describing the deviation of real emissions from the ideal emissions obtained by the emissions model, such as computing relative differences, are possible and covered by the method of the invention.

The value of the deviation, i.e. preferably soot_ratio, is now fed into a further algorithm MK for correcting the emissions model EM. For the correction of the emissions model there exist a number of possibilities, which will be further described below.

FIG. 3 presents a very simple procedure for the correction MK. A factor f_K is derived from the deviation soot_ratio, and multiplied with the output of the emissions characteristic map m_soot_roh(t). The corrected estimated particle emission for each point in time t is thus given by:

$$m\_soot(t) = m\_soot\_roh(t) * f\_K.$$

In the simplest case the correction factor is the reciprocal value of the ratio between estimated and measured emissions soot_ratio:

$$f\_K = 1/soot\_ratio = m\_soot\_real/m\_soot\_ideal.$$

It is however of particular advantage if the correction factor based on soot_ratio is only slightly changed for each measurement in order to smooth out fluctuations. To this end the last value of f_K is stored in a variable f_K_alt, and the new value f_K for a changed soot_ratio arising from a new measurement by the integrated particle sensor is determined by the equation:

$$f\_K = f1 * f\_K\_alt + (1-f1)/soot\_ratio,$$

where f1 is a factor between 0 and 1, preferably between 0.85 and 0.95. The correction factor is newly computed each time when the signal M_aktiv indicates the end of a particle measuring cycle.

Furthermore it is advantageous to change the value of f_K only if soot_ratio lies within a certain plausibility interval, in order to avoid large errors due to faulty measurements. The limits of the plausibility interval depend on the measurement accuracy of the integrating particle sensor, values of 0.5 and 2 being advantageous.

FIG. 4 shows an improved method for correcting the emissions model EM. The improved method is based on the assumption that the deviations between the emissions of an ideal engine as embodied in the emissions characteristic map and the emissions of a real engine can depend on the operational state, i.e. the operating point of the engine. For this reason a correction characteristic map KK is used instead of one and the same factor for all operating points, which contains correction factors dependent on the specific operating point. To determine particulate emissions m_soot(t) the value from the emissions model m_soot_roh(t) is multiplied by the correction factor obtained from the correction characteristic map KK for the given operating point. In this context it will be of advantage if the correction characteristic map KK has the same independent variables as the emissions model EM, e.g. engine speed n and torque M of the engine. It would also be possible, however, that the correction characteristic map is defined over a smaller number of independent variables than the emissions characteristic map.

The determination of the correction factors which depend on the operating point will now be explained: while the integrating particle sensor is actively measuring (signal M_aktiv), the relative frequency of the engine operating points during the measurement period of the integrating particle sensor is determined from yet another characteristic map H ("histogram") which is defined over the same independent variables as the correction characteristic map KK. In a preferred variant the correction map KK and the histogram H is defined over the independent variables engine speed and torque. The axes are subdivided in intervals of length Δn for speed and ΔM for torque, for instance for the speed n intervals of 100 rpm and for torque intervals with a width of 5% of the maximum engine torque M. The number of grid squares and thus the number of sampling points are the same for correction map KK and histogram H.

At fixed time intervals Δt, for instance every 20 ms, during the measuring period of the integrating particle sensor, the grid square containing the present engine operating point is determined. The frequency value H_abs(m,M) of the respective grid square is increased by 1. When the measurement period of the integrating particle sensor has ended the relative frequency h_rel(m,M) of each grid square is computed by dividing the absolute frequency H_abs(m,M) by the duration of the measurement period expressed in units of Δt.

After the measurement period has ended the correction factor f_K is computed from the equation $$f\_K = 1/\text{soot\_ratio} = m\_\text{soot\_real}/m\_\text{soot\_ideal}$$

and for all those grid squares of the correction map KK for which the value h_rel(m,M) in the corresponding grid square of the histogram H exceeds the value h_rel_min, for instance 0.02, the correction factor of the correction map KK is modified.

As already mentioned above, the correction map factor f_K(m,M) can for these grid squares be replaced by the value f_K. It is however particularly advantageous, in analogy to the procedure described above for a single parameter, to store the last values of f_K(m,M) for all grid squares of the correction characteristic map in a correction_map_old containing now the values f_K_alt(m,M). After the end of measurement of the integrating particulate filter the value of the correction factor is determined for all grid squares for which the corresponding value h_rel(m,M) of the histogram map exceeds the threshold h_rel_min, e.g. 0.02. The new correction factor is computed using the equation $$f\_K(m,M) = f1 * f\_K\_alt(m,M) + (1-f1)/\text{soot\_ratio}$$

where f1 has a value between 0 and 1, preferably between 0.85 and 0.95.

After the correction map KK has been updated the values H_abs(m,M) of the histogram are reset to zero.

The control procedure can be implemented in the engine control unit. As an alternative it is possible to implement the control procedure in an external control device, for instance a "vehicle control computer", which is frequently used in heavy duty vehicles.

If sensors are used which can discriminate between combustible and non-combustible particles, the procedure can be executed separately for both kinds of particles.

FIG. 5 shows a second variant of the configuration of the system: a particulate filter 12 is located in the exhaust gas duct 15 of an internal combustion engine 11. In this variant an oxidizing catalytic converter 16 is positioned in front of the particulate filter 12, but is not mandatory. For determining the temperature of the particulate filter 12 at least one temperature sensor 13 is provided, which may be placed before or behind the particulate filter 12, possibly also before the oxidizing converter 16.

The internal combustion engine is controlled by an electronic control device 14. The temperature sensor 13 is also connected to the control device 14. Further sensors, for instance a difference pressure sensor, are possible but not mandatory for the method of the invention.

The electronic control device 14 also contains a model which computes at least a mean temperature of the particulate filter 12, using the signal of the at least one temperature sensor and other quantities. A model of greater complexity, which computes temperatures for a plurality of sites in the particulate filter 12 (e.g. entry, middle, exit) would be possible, but is not strictly necessary.

FIG. 6 shows a relevant part of the control algorithm in the engine control device 14. A known emissions model EMP for particles supplies a value for the particle mass m_soot emitted by the engine 11. A further emissions model EMNOx supplies a value for the mass of nitrogen oxides m_NOx present in the exhaust gas stream entering the particulate filter 12. In simple cases the quantities m_soot and/or m_NOx are each given a fixed value, in other variants the values are determined from characteristic maps as functions of operational data of the engine, such as engine speed n and torque M. More complex models comprising further operational parameters are also possible.

In a special variant an emissions model is used, which supplies two separate mass values for NO (nitrogen oxide) and $NO_2$ (nitrogen dioxide) instead of one mass value for nitrogen oxides.

The control algorithm furthermore contains a model CRT-M for the oxidation of soot particles by NOx, which determines a factor f_CRT representing the degree in which the nitrogen oxides in the particulate filter oxidize the particles present in the exhaust gas. This factor is primarily dependent on the temperature of the particulate filter 12. For temperatures below 200° C. there is no oxidation by NOx.

In a simple variant the model CRT-M consists of a characteristic curve over the temperature of the particulate filter 12, which at low temperatures has the value zero and approaches a fixed value for high temperatures. This fixed value takes into account the differing (mean) molecular masses of nitrogen oxides and soot and thus corresponds to the reciprocal value of the experimentally determined NOx-soot ratio, i.e. the threshold above which soot particles are no longer deposited in the particulate filter.

In further variants the model CRT-M may also be extended to account for differing temperatures at different sites of the particulate filter 12 and/or for a separation of nitrogen oxides into NO and $NO_2$.

The model CRT-M may be used for both non-coated particulate filters and particulate filters with catalytic coating. For particulate filters 12 with catalytic coating the factors f_CRT will usually be higher than for non-coated particulate filters of the same temperature.

By multiplying the factor f_CRT with m_NOx, the mass of nitrogen oxides determined by the NOx-emissions model EMNOx, a negative particle equivalent mass m_soot_neg is determined, which represents the mass of soot particles in the exhaust gas that can be oxidized by NOx at the given temperature of the particulate filter 12.

In a further computational step the particle mass m_soot estimated by the emissions model EMP and the negative particle equivalent mass m_soot_neg are added, resulting in the effective particulate mass m_soot_eff, which can be deposited in the particulate filter 12.

The effective particulate mass m_soot_eff is now fed into a computational model DPF-M of a particulate filter. In a simple version this model consists only of a simple integrator, which accumulates the particles deposited in the filter 12. In other variants a more complex model of the particulate filter 12 may be used, for instance a model which has a plurality of cells along the flow direction of the exhaust gas.

FIG. 7 shows a particularly advantageous variant of the method according to the invention: here the consideration that the nitrogen oxides present in the exhaust gas duct 15 will oxidize soot particles currently present in the exhaust gas much better than those already deposited in the particle filer 12, is also taken into account. According to the computation procedure given above for m_soot_eff this quantity may assume even negative values if the ratio of NOx to particles in the exhaust gas is very high. To take into account that, even if a high surplus of NOx over particles is prevalent in the exhaust gas, particles already deposited in the particulate filter 12 will be removed only very slowly, a computational unit Be is provided, which limits the effective particulate mass entering computation of the filter deposit load to the only slightly negative value m_soot_eff_lim.

Whereas the above variants and the figures show mass flows of the exhaust gas components one might as well use the corresponding concentrations or the volume flow of exhaust gas.

The control procedure can be implemented in the engine control unit. Alternatively it is possible to implement the control procedure in an external control device, for instance a "vehicle control computer", which is frequently used in heavy duty vehicles.

The method of the invention is suitable for diesel engines as well as for spark-ignited engines.

FIG. 8 shows the configuration of the system in principle. A particulate filter 103 is placed in the exhaust gas duct 102 of an internal combustion engine 101. An oxidizing catalytic converter, which is not shown here, could be placed before the particulate filter 103.

The engine control unit is designated CPU. Based on the operating point as determined by the engine control unit CPU, the emissions model 105 computes raw emissions, such as NOx, HC, CO, and particulate emissions or the like. A particulate emissions model EMP, which computes estimates for the masses or concentrations of particles in the exhaust gas, is part of the emissions model 105. A particulate filter model PF-M is provided for modelling the depositing of particles in the particulate filter 103. The emissions model 105, the EMP model and the particulate filter model PF-M can be modified via sensors 106, 107 and corrector steps 108, 109, if required. The particulate filter model PF-M determines the deposit load state and transmits regeneration requests to a regeneration control unit 110, which initiates the next regeneration process for the particulate filter 103 via the engine control unit CPU. Reference numeral 111 designates data describing the state of the vehicle and the driving situation, which are fed to the engine control unit CPU. The emissions model 105, the particulate emissions model EMP and/or the particulate filter model PF-M could be incorporated in the engine control unit CPU. But it is also possible to implement at least one of the models in a separate control unit or in an external control device, for instance a "vehicle control computer", which is often used in heavy duty vehicles.

FIG. 9 shows a relevant part of the control algorithms in the engine control unit CPU. A known particulate emissions model EMP supplies a value for the mass m_soot or the concentration of particles in the exhaust gas. The EMP model can utilise operational variables of the engine such as engine speed n or torque M and/or data supplied by the sensors 106, 107 located in the exhaust duct. The exhaust gas volume stream is indicated by $m_A$.

The control algorithms also comprise a particulate filter model PF-M, which models the depositing of particles in the particulate filter 103. Models which determine the total mass of particles deposited are known in the art. The method of the invention is employing a model consisting of n fictitious cells Z1, Z2, . . . Zn, with n assuming the values 1 or more, and preferably 4 to 8. It is of particular advantage if the cells Z1, Z2, . . . Zn are aligned in the flow direction of the exhaust gas, i.e. if a one-dimensional model of the particulate filter 103 is used.

The cells Z1, Z2, . . . Zn, can simulate sections of the particulate filter 103 with different lengths, but computation is particularly simple if each of the cells Z1, Z2, . . . Zn will model a section of the particulate filter 103 of one and the same length.

From the distribution of particles over the cells Z1, Z2, . . . Zn of the particulate filter model PF-M information concerning the deposit load state BZ is inferred, as is explained in more detail below. This information concerning the deposit load state BZ is fed to computation routine R_ANF, which determines from BZ and possibly from other data a request ANF to regenerate the particulate filter 103. As is known from the literature the request ANF may be formulated as a binary (yes/no) request or as a numerical deposit state index expressing an assessment of the urgency of regeneration of the particulate filter.

As is also known in the art, the request ANF may in further computation routines (not shown here) be combined with further information before it actually triggers regeneration of the particulate filter 103.

FIG. 10 shows the model PF-M of the particulate filter 103. In cell i of the n cells Z1, Z2, . . . Zn, the particle mass m_i is deposited, i.e. m_1 in the first cell Z1, m_2 in the second cell Z2, etc. A simple algorithm for computing the distribution of particles over the cells Z1, Z2, . . . Zn, splits the particle mass m_i_ein arriving at the entrance of each of the cells Z1, Z2, . . . Zn, of the model PF-M, into two components m_i_par and m_i_trans. Here m_i_par is that portion of the particles which is moved parallel to the flow direction 112 of the exhaust gas, while m_i_trans designates that portion which moves transversally to the direction 112 of exhaust gas flow and is deposited on the wall of the particulate filter 103. For each of the cells Z1, Z2, . . . Zn, the following equation is valid:

$$m\_i\_ein = m\_i\_\text{trans} + m\_i\_par.$$

On the other hand the particle mass m_i_par, which is moving out of cell Zi in parallel with the exhaust duct, equals the particle mass arriving at the entrance of the next cell i+1 of the cells Z1, Z2, . . . Zn. Thus $$m\_(i+1)\_ein = m\_i\_par.$$

The total particle mass arrives at the entrance of the first cell Z1:

$$m\_1\_ein = m\_\text{soot}.$$

Furthermore one may assume that a wall-flow particulate filter will almost completely remove the particles from the exhaust gas, i.e. that at the exit of the last cell there are no more particles transported parallel to the flow direction:

$$m\_n\_par \approx 0.$$

The particle mass m_i deposited in each of the cells Z1, Z2, . . . Zn is found by integrating the transversal component m_i_trans over time.

The split of m_i_ein into two components m_i_par and m_i_trans is advantageously described by a factor f_i, which differs from cell to cell:

$$m\_i\_par = f\_i * m\_i\_ein$$

and $$m\_i\_\text{trans} = (1 - f\_i) * m\_i\_ein.$$

Since, as mentioned above, no particles exit at the end of the particulate filter, one has the relationship:

$$f\_1 * f\_2 * \ldots * f\_n \approx 0.$$

From the literature it is known that deposition of particles on the wall of the filter increases with the local velocity of flow through the wall $v\_i\_trans$. Therefore it is advantageous to compute the factors $f\_i$ by an expression quadratic in $v\_i\_trans$:

$$1 - f\_i = f + g * v\_i\_trans + h * (v\_i\_trans)^2.$$

By methods known from the literature, the velocities $v\_i\_trans$ may be obtained from the flow velocity of the exhaust gas before the particulate filter and from the resistance against flow through the wall of each cell, which resistance in turn depends on the particle mass $m\_i$ already deposited in cell $Zi$.

It is understood that more complex relationships are possible, but for the sake of clarity these will not be discussed here in detail.

Depending on the deposit load state of the particulate filter 103, which is characterised by the particle mass $m\_i$ deposited in each cell $Zi$, the computational routine R_ANF can now output a request for regenerating the particulate filter 103.

In an enhancement of the method according to the invention the particle mass $m\_i$ deposited in each cell $Zi$ is divided by the volume of the particulate filter 103 assigned to cell $Zi$ to obtain the particle load $B\_i$ of each cell $Zi$. If the particle load of a cell $Zi$ exceeds a threshold $B\_max$, regeneration is requested. The threshold value $B\_max$ depends on the material of the particulate filter 103 and on the way in which the particulate filter is built into the exhaust duct 102. For a particulate filter 103 made of silicon carbide (SiC) a maximum load between 2 g/l and 12 g/l, preferably between 8 g/l and 10 g/l, is advantageous.

In a further advantageous variant the comparison with $B\_max$ is performed not with the load $B\_i$ of a single cell, but with the load averaged over a number of cells, e.g. two or three cells.

In another variant different particle load thresholds $B\_max$ are used for different parts of the particulate filter 103. Here it is of particular advantage if the threshold has a lower value in the front part of the particulate filter 103 than in the back part, since an exceedingly high load of the particulate filter 103 in its front part may rapidly cause clogging of the particulate filter 103.

If the regeneration request ANF is not formulated as a binary (yes/no) value but as a numerical deposit state index expressing an assessment of the urgency of regeneration of the particulate filter, it is of advantage if this deposit state index depends on the number of cells $Zi$ of the particulate filter 103 in which the load $B\_i$ exceeds the threshold $B\_max$.

In this instance it is even more advantageous if there is a first threshold value $B\_max\_1$ and a second threshold value $B\_max\_2$, with preferably $B\_max\_2$ greater than $B\_max\_1$. In this enhanced version of the method according to the invention the deposit state index depends on the number of cells whose load $B\_i$ exceeds the first threshold $B\_max\_1$ and on the number of cells whose load $B\_i$ also exceeds the second threshold $B\_max\_2$, the number of cells whose load exceeds $B\_max\_2$ having greater influence on the deposit state index than the number of cells $Zi$ whose load exceeds only $B\_max\_1$.

It is furthermore of advantage to classify particles as combustible (soot) and non-combustible (ash) and to compute the load on each cell $Zi$ separately for combustible and non-combustible particles.

It is also advantageous to request regeneration of the particulate filter 103 only if the load of combustible particles on one cell or an averaged number of cells $Zi$ exceeds a threshold for combustible particles $B\_brennbar\_max$.

FIG. 11 shows another advantageous variant of the invention. Here allowance is made for the fact that nitrogen oxides (NOx) present in the exhaust gas stream can substantially reduce the deposition of particles in the particulate filter 103 (so-called CRT-effect), especially if the temperature of the particulate filter 103 is high and/or the filter has a catalytic coating.

For this reason it is proposed to employ a further model EMNOx describing emission of nitrogen oxides, in addition to the particulate emissions model EMP. Such a model supplies a value $m\_NOx$ for the mass or concentration of nitrogen oxides in the exhaust gas stream, which value may for instance be obtained from a characteristic map having engine speed n, torque M or similar operational parameters as independent variables.

Furthermore there is provided a NOx-influence model (NOx-MOD), which takes into account the influence of nitrogen oxides on the mass of particles deposited in the particulate filter 103. Based on the particle mass $m\_soot$ obtained from the particulate emissions model EMP, the mass of nitrogen oxides $m\_NOx$ obtained from the NOx-emissions model EMNOx, and the temperature $T\_PF$ of the particulate filter, this model determines an effective particulate mass $m\_soot\_eff$, which is reduced due to the temperature-dependent influence of the nitrogen oxides and is deposited in the particulate filter 103.

The temperature $T\_PF$ is taken into consideration because oxidation of particles by NOx depends on the temperature of the particulate filter 103. Below temperatures of approximately 200° C. oxidation by NOx will not occur.

In a simple embodiment the mass $m\_NOx$ of nitrogen oxides is multiplied by a factor $f\_Temp$ in the model NOx-MOD, the factor being dependent on the temperature of the particulate filter $T\_PF$; the product is subtracted from the particle mass $m\_soot$ and the result of the subtraction is limited below to an only slightly negative value, giving finally an effective particulate mass $m\_soot\_eff$. The factor $f\_Temp$ is zero for low temperatures and assumes a fixed value at high temperatures, which takes into account the different (mean) molecular masses of nitrogen oxides and soot.

In FIG. 12 the particle mass distribution in flow direction relative to position in the particulate filter is shown after loading has occurred. Curve A is the measured mass $m_p$ of the particles, curve B the mass $m_p$ of particles in the particulate filter obtained from the deposition model, the particulate filter 103 having been partitioned into four cells. The accumulated mass $m_p$ of particles in cell $Z1$, $Z2$, $Z3$, $Z4$, is shown in FIG. 13. A for measured mass and B for mass obtained from the deposition model. One observes good agreement between measured and computed values.

The method of the invention has been explained using mass flows of the exhaust gas components. Instead of mass flows corresponding concentrations or the volume flow of exhaust gases could be used.

The invention claimed is:

1. Method for determining particulate emissions in the exhaust gas stream of an internal combustion engine, comprising the following steps:

preparing an emissions model based on an operational characteristic map of the engine;

measuring actual particulate emissions in the exhaust gas stream during a fixed or variable measuring interval and integrating particulate emissions over the measuring interval;

computing ideal particulate emissions during the measuring interval by means of the emissions model and integrating ideal particulate emissions over the measuring interval;

comparing measured actual particulate emissions and computed ideal particulate emissions;

determining a correction factor based on the difference of measured actual particulate emissions and computed ideal particulate emissions; and taking into account the correction factor when determining ideal particulate emissions from the emissions model.

2. Method according to claim 1, wherein a uniform correction factor is chosen for all operating points of the internal combustion engine.

3. Method according to claim 1, wherein different correction factors are chosen for different operating regions.

4. Method according to claim 3, wherein the different correction factors are determined on the basis of a correction characteristic map.

5. Method according to claim 3, wherein the different correction factors are determined taking into account the frequency distribution of operating points of the internal combustion engine.

6. Method according to claim 1, wherein a new correction factor f_K is computed from an old value of the correction factor f_K_alt and a ratio soot_ratio between actually measured and computed ideal particulate emissions, using the formula f_K=f1*f_K_alt ×(1−f1)/soot_ratio, where the coefficient f1 has a value between 0 and 1.

7. Method according to claim 6, wherein the coefficient f1 has a value between 0.85 and 0.95.

8. Method according to claim 1, wherein the correction is carried out only if its value lies within a plausibility interval.

9. Method for determining a particle load deposited in a particulate filter located in an exhaust duct of an internal combustion engine, including the following steps:

preparing an emissions model for particles which is based on a characteristic map;

preparing at least one, characteristic-map-based emissions model for nitrogen oxides;

preparing a temperature-dependent model for the oxidation of soot particles by nitrogen oxides;

determining at least one value selected from the group theoretical particle mass or particle concentration for at least one operating point using the emissions model for particles;

determining at least one value selected from the group mass or concentration of nitrogen oxides for at least one operating point using the emissions model for nitrogen oxides;

determining at least one value selected from the group negative equivalent particle mass or negative equivalent concentration for the nitrogen oxide mass or concentration determined in the preceding step, using the oxidation model of soot particles by nitrogen oxides;

determining at least one value selected from the group effective particulate mass or concentration using the emissions model for particles and the negative equivalent particle mass and/or concentration; and accumulating the effective particulate mass or concentration in a model of the particulate filter.

10. Method according to claim 9, wherein separate characteristic-map-based emissions models for NO and $NO_2$ emissions are prepared, and wherein NO and $NO_2$ emissions are determined for the at least one operating point, and wherein effective particulate masses or concentrations are determined on the basis of the NO and $NO_2$ emissions.

11. Method according to claim 9, wherein a temperature of the particulate filter is measured at least at one point and that the negative equivalent particle mass or the negative equivalent particle concentration is determined depending on the temperature of the particulate filter.

12. Method according to claim 11, wherein the temperature of the particulate filter is determined by measuring the exhaust gas temperature upstream of the particulate filter.

13. Method according to claim 9, wherein for determination of the effective particulate mass it is taken into account that the nitrogen oxides in the exhaust duct will oxidize the soot particles present in the exhaust gas better than the soot particles already deposited in the particulate filter.

14. Method according to claim 13, wherein the value for the effective particulate mass is limited by a lower bound.

15. Method for controlling the regeneration of an exhaust treatment device, especially a particulate filter, by means of a characteristic-map-based computational model, where the exhaust treatment device is divided into at least two cells, and where a deposit load state of each cell is determined by means of a deposition model and a regeneration process for the exhaust treatment device is initiated depending on the deposit load state, wherein a deposit state index is determined which is based on the deposit load state of at least one cell, and that the regeneration process is initiated depending on the value of the deposit state index.

16. Method according to claim 15, wherein at least two cells are defined one behind the other in flow direction.

17. Method according to claim 15, wherein the cells are defined to be at least approximately of equal size.

18. Method according to claim 15, wherein at least for a group of cells two threshold values each are defined, and that the deposit state index is determined depending on the frequency with which the threshold values are exceeded.

19. Method according to claim 18, wherein the exceeding of a higher threshold value has greater influence on the deposit state index than the exceeding of lower threshold values.

20. Method according to claim 15, wherein the particulate load of the exhaust treatment device is divided into combustible and non-combustible particles, and that the deposit load of each cell is separately determined for combustible and non-combustible particles.

21. Method according to claim 20, wherein the regeneration of the exhaust treatment device is initiated only if the deposit load of one or more cells due to combustible particles exceeds a threshold value for combustible particles.

22. Method according to claim 15, wherein the deposit load state of each cell is determined depending on the nitrogen oxides present in the exhaust gas stream or depending on the temperature of the exhaust gas treatment device.

23. Method according to claim 15, wherein the deposition model divides the mass of particles entering each cell into a part which is deposited in the cell and a part which exits the cell.

24. Method for controlling the regeneration of an exhaust treatment device, especially a particulate filter, by means of a characteristic-map-based computational model, where the exhaust treatment device is divided into at least two cells and preferably at least five cells, and where the deposit load state of each cell is determined by means of a deposition model and a regeneration process for the exhaust treatment device is initiated depending on the deposit load state, wherein at least one threshold value for the maximum permissible deposit load state is defined for each cell, and wherein the regeneration process for the exhaust treatment device is initiated if the deposit load state of at least one cell exceeds the corresponding threshold value.

25. Method according to claim 24, wherein at least two cells are defined one behind the other in flow direction.

26. Method according to claim 24, wherein the cells are defined to be at least approximately of equal size.

27. Method according to claim 24, wherein for each cell at least one threshold value for the maximum permissible deposit load state is defined.

28. Method according to claim 27, wherein the threshold values of at least two cells are defined to have different values, with the threshold value of an upstream cell being defined smaller than the threshold value of a downstream cell.

29. Method according to claim 24, wherein a regeneration process is initiated if the deposit load state of at least one cell exceeds the corresponding threshold value.

30. Method according to claim 24, wherein a regeneration process is initiated if a mean value of the deposit load states of a plurality of cells exceeds the corresponding threshold value.

31. Method according to claim 24, wherein a deposit state index is determined based on the deposit load state of at least one cell, and that the regeneration process is initiated depending on the deposit state index.

32. Method according to claim 24, wherein at least for a group of cells two threshold values each are defined, and that the deposit state index is determined depending on the frequency with which the threshold values are exceeded.

33. Method according to claim 32, wherein the exceeding of a higher threshold value has greater influence on the deposit state index than the exceeding of lower threshold values.

34. Method according to claim 24, wherein the particulate load of the exhaust treatment device is divided into combustible and non-combustible particles, and that the deposit load of each cell is separately determined for combustible and non-combustible particles.

35. Method according to claim 34, wherein the regeneration of the exhaust treatment device is initiated only if the deposit load of one or more cells due to combustible particles exceeds a threshold value for combustible particles.

36. Method according to claim 24, wherein the deposit load state of each cell is determined depending on the nitrogen oxides present in the exhaust gas stream or depending on the temperature of the exhaust gas treatment device.

37. Method according to claim 24, wherein the deposition model divides the mass of particles entering each cell into a part which is deposited in the cell and a part which exits the cell.

* * * * *